Nov. 12, 1935.  W. S. H. HAMILTON  2,021,005
CONTROL SYSTEM FOR OIL ELECTRIC LOCOMOTIVES
Filed Feb. 10, 1933  3 Sheets-Sheet 1
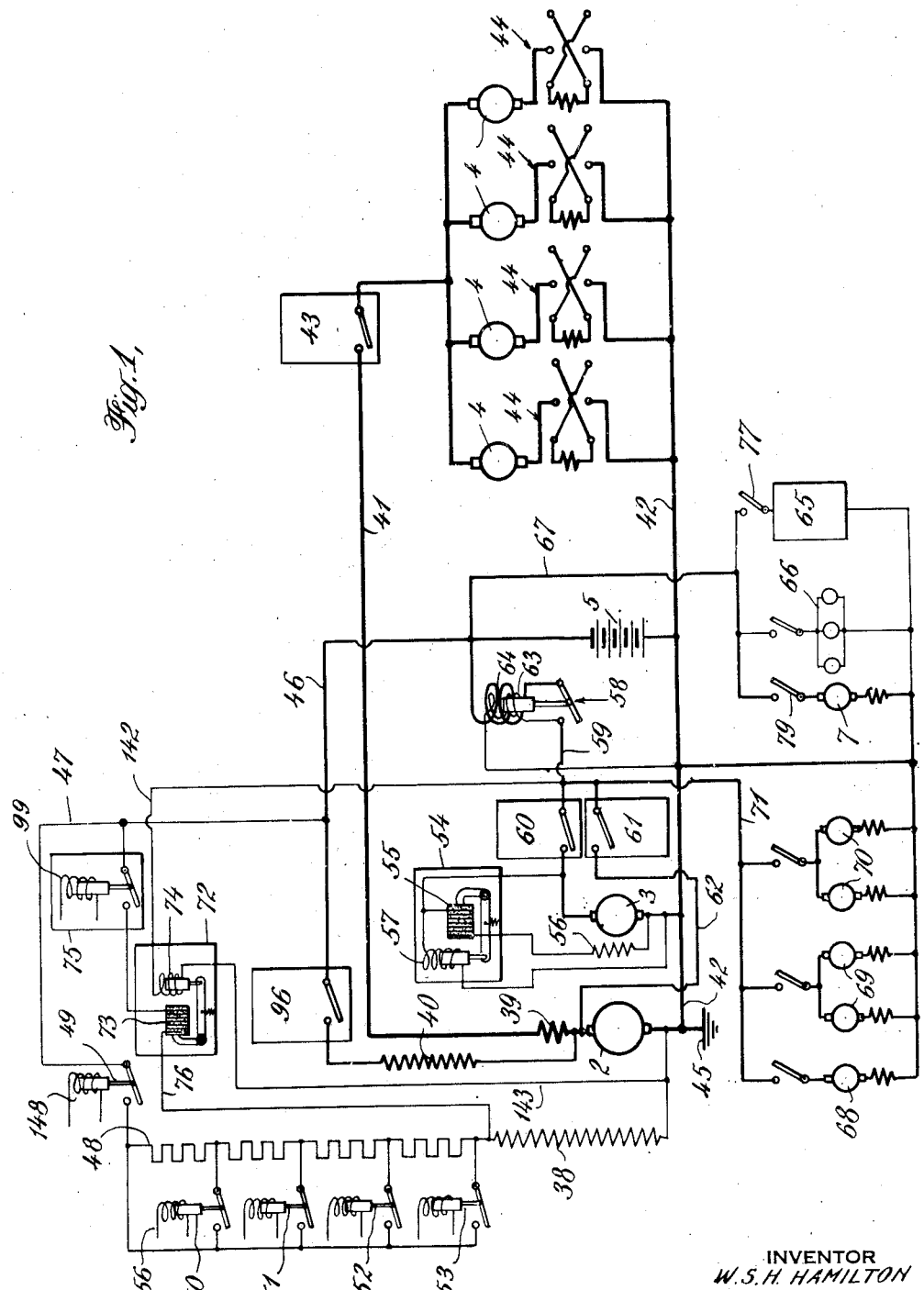
INVENTOR
W.S.H. HAMILTON
BY
his ATTORNEYS

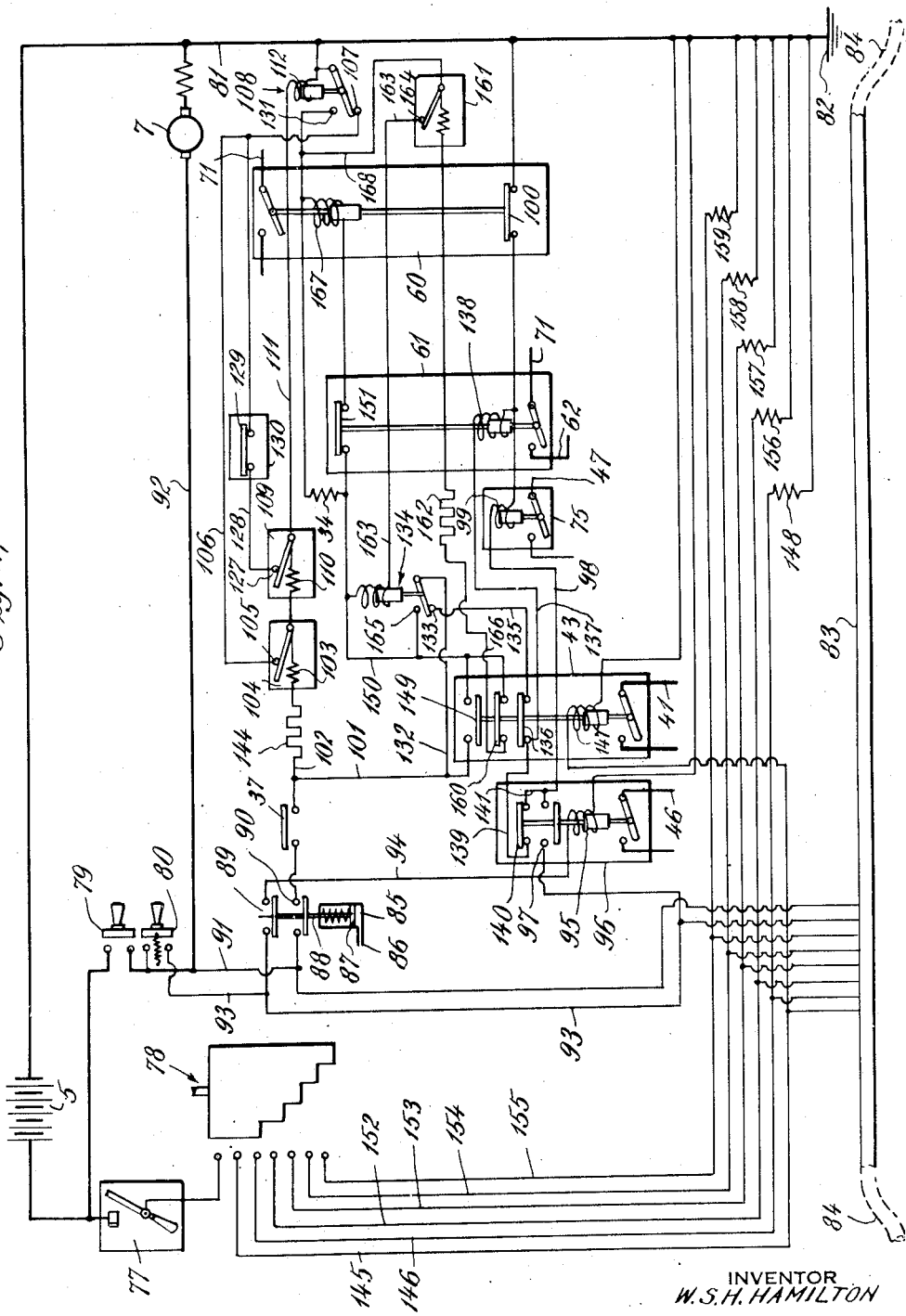

Nov. 12, 1935.  W. S. H. HAMILTON  2,021,005
CONTROL SYSTEM FOR OIL ELECTRIC LOCOMOTIVES
Filed Feb. 10, 1933  3 Sheets-Sheet 3
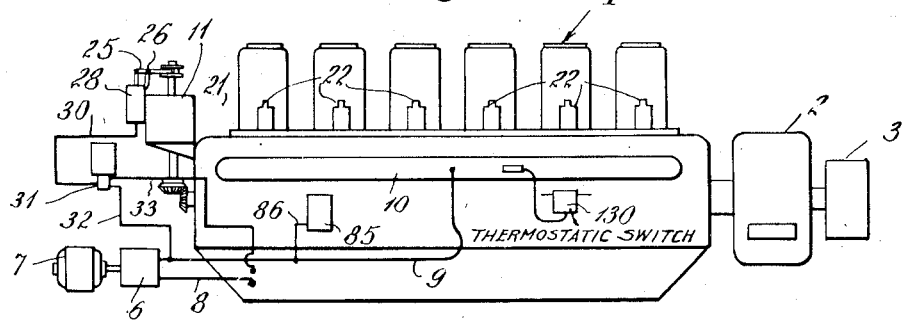
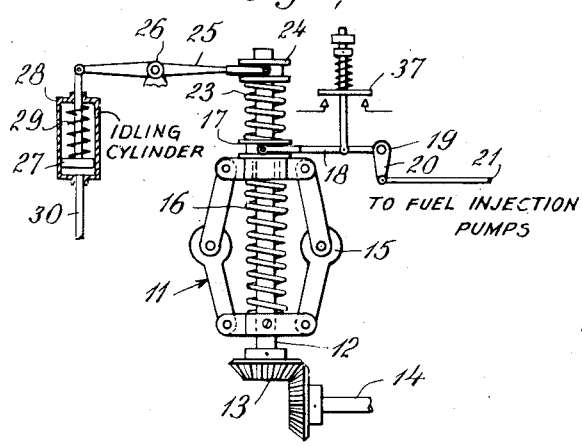
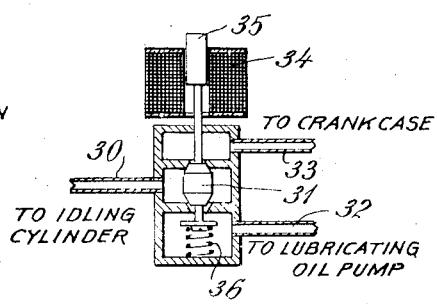
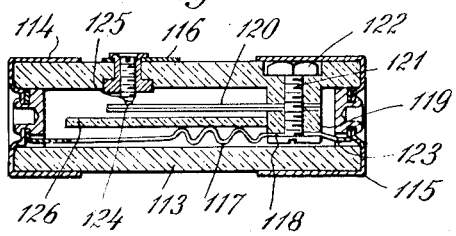
INVENTOR
W.S.H. HAMILTON
BY
HIS ATTORNEYS Patented Nov. 12, 1935

2,021,005

UNITED STATES PATENT OFFICE 2,021,005

CONTROL SYSTEM FOR OIL-ELECTRIC LOCOMOTIVES

William S. H. Hamilton, Larchmont, N. Y.

Application February 10, 1933, Serial No. 656,143

24 Claims. (Cl. 290—17)

This invention relates to power systems in which internal combustion engines are utilized as prime movers and electric motors as work performers. More particularly, the present invention relates to vehicles which are propelled by one or more electric motors supplied with power from a generator operated by an internal combustion engine that is carried by the vehicle. One of the most common uses of such vehicles is as locomotives for moving railway freight and passenger cars and the invention will be described in connection therewith.

In locomotives of this sort as usually constructed the internal combustion engine is so connected with the control equipment of the locomotive that the speed of the locomotive is increased by increasing the speed of the internal combustion engine. That is to say, with the "controller" in the "off" position the internal combustion engine operates at idling speed. Then, when it is desired to start the locomotive and the controller is moved to its first and succeeding accelerating positions, the speed of the internal combustion engine is gradually increased, and this increases the locomotive speed. Ordinarily the engine will not attain its full normal operating speed until the last position of the controller has been reached. This is disadvantageous, particularly in certain kinds of switching service where rapid acceleration is required, inasmuch as the full power of the internal combustion engine is not immediately available for accelerating the locomotive and its load, and because a part of the power output of the engine is necessarily utilized in overcoming its own inertia and that of the generator connected to it. This tends to make the locomotive sluggish in starting, which is particularly undesirable in many switching operations.

A further disadvantage of propulsion systems of this type is apparent in locomotive switching operations of the sort where it is necessary to make frequent starts and stops. In such work the locomotive engineer repeatedly moves the controller handle back and forth at short intervals between the off position and the first or other accelerating positions. Consequently, the internal combustion engine is being continually speeded up and slowed down. The engine commences to slow down to idling speed as soon as the controller is thrown to the off position, and, vice versa, when the controller is moved back to the first position, the engine commences to speed up again. Such continual changes in speed, accompanied by high loading of the engine while it is operating at slow speed tend to produce excessive wear on the engine bearings.

It is important that the internal combustion engine be operated only as much as necessary at full speed without load or with very light load, as this also causes increased bearing wear. Accordingly, one of the objects of my present invention is to provide a propulsion system in which the full rated speed of the engine will be available during the usual operation of the vehicle and at the same time to prevent the operation of the engine at full speed when the vehicle stands idle for a long period of time. Another object of the invention is to provide fast acceleration of the vehicle under conditions which will tend to avoid increase in maintenance cost.

It is important also in the operation of such vehicles that the engine be not operated at full speed and under heavy loads while it is cold since the various parts of its mechanism are not in their normal positions with respect to one another which they assume through expansion after the engine has reached its normal operating temperature. In the practical operation of locomotives of this kind it has been found that the locomotive operators cannot be relied upon to use care in this respect. A further object of my invention is therefore to provide a propulsion system in which it is impossible to bring the internal combustion engine up to its full operating speed until after the engine has operated at idling speed for a sufficient length of time for the engine to reach a temperature high enough to prevent trouble due to expansion of parts when it is loaded up.

It is also an object of the invention to prevent the operation of the engine at full speed, even though it is warm when started, until a sufficient time has elapsed to allow a proper flow of lubricating oil to the bearings to be established.

The characteristic features of my present invention which I believe to be novel will be definitely set forth in the claims appended hereto, while the features of construction, the mode of operation and additional objects of the invention will be readily understood from a consideration of the following detailed description taken in connection with the accompanying drawings wherein I have shown my invention as embodied in a propulsion system for a locomotive.

Referring to these drawings:

Fig. 1 is a diagram showing the main and auxiliary circuit connections;

Fig. 2 is a diagram showing the circuit connections of the control mechanism;

Fig. 3 represents a diagrammatic view in side elevation of the internal combustion engine, generator and certain details of the control mechanism;

Fig. 4 represents a diagrammatic side elevation of the engine speed governor;

Fig. 5 represents a diagrammatic sectional view of an electromechanically operated valve used in connection with the speed governor; and Fig. 6 represents a view in longitudinal section of an electro-thermostatic time delay relay which forms a part of the control mechanism.

Referring first to Fig. 3 of the accompanying drawings, the internal combustion engine 1 is preferably of the Diesel type and serves to drive a main electric generator 2 and an auxiliary generator 3. It will be understood that these parts are appropriately mounted within the cab of the locomotive and that power developed by the engine 1 is transmitted to the axles of the locomotive by means of the main generator 2, the circuit connections shown in Fig. 1 and the propelling motors 4.

The auxiliary generator 3 is provided to charge a storage battery 5 (Fig. 1) and supply power for the auxiliary circuits, when the engine is operating at full speed. The battery is charged and these circuits are operated from the main generator 2 when the engine is operating at idling speed. In the embodiment of the invention shown in the drawings, the battery 5 is not employed at any time to deliver energy to the propelling motors 4, but is provided for the purpose of operating the auxiliary circuits, including the air compressor, when neither the main generator 2 or the exciter 3 is connected to these auxiliary circuits.

Engine 1 is provided with lubrication by means of an oil pump 6 driven by an electric motor 7. This pump removes oil through pipe 8 from the reservoir in the crank case of the engine and delivers it through pipe 9 to an oil manifold 10 which distributes the oil to the engine bearings and other parts which require lubrication.

The speed of engine 1 is automatically regulated or maintained by means of a governor 11, the essential details of which are shown in Fig. 4. The governor mechanism is carried upon a shaft 12 which is driven through gearing 13 from the engine shaft 14. This mechanism is of the so-called fly-ball type and includes a pair of suitable weights 15 which tend to move away from the shaft 12 as the speed of the engine increases and towards the shaft as the engine speed decreases. They act through the linkages shown to compress the governor spring 16. As spring 16 is compressed a collar 17 moves downwardly and carries with it one arm 18 of a bell crank which is pivoted at 19. The other arm 20 of the bell crank is connected through a link 21 to the fuel injection pumps 22 of the engine and thereby increases or decreases the supply of fuel as the governor weights 15 move inwardly or outwardly, thus tending to maintain the speed of the engine at a substantially constant value. It will be understood that the governor mechanism so far described is arranged to regulate or control the operation of the engine at full speed.

In order to change the setting of the governor 11 so as to cause it to reduce the speed of the engine from full speed to idling speed and maintain the operation of the engine substantially constant at such reduced speed, I provide an auxiliary spring 23 which is carried upon the upper portion of governor shaft 12. The lower end of spring 23 engages collar 17 and the upper end is in turn engaged by a collar 24 which, like collar 17, is movable longitudinally on shaft 12. Such movement of collar 24 is effected by means of a forked arm 25 which is pivoted at 26 to the frame of the engine. This arm is actuated by means of a piston 27 which operates within a fluid pressure cylinder 28. Piston 27 is biased downwardly by means of a spring 29 in order to hold the collar 24 in elevated position, thereby permitting the engine to operate at full speed.

Fluid pressure may be admitted to idling cylinder 28 by means of an oil line or duct 30, and when so admitted it causes piston 27 to rise, compressing spring 29 and through lever 25 also compressing the auxiliary governor spring 23. This has the effect of reducing the force exerted by the governor spring 16 upon the governor weights 15, thereby changing the setting of the governor and maintaining the engine at a substantially constant but reduced speed. Spring 23 is chosen to have the proper tension to so change the governor setting as to cause the engine to operate at the desired idling speed, which for a Diesel engine is ordinarily about one half of its rated full speed.

The admission and release of fluid pressure to the idling cylinder 28 to change the engine speed is effected by means of the locomotive control mechanism illustrated in Fig. 2 which will be described in detail presently, and, in order conveniently to make provision for this, a two-way electromagnetically operated valve shown in Fig. 5 in diagrammatic detail is provided. This valve has three oil lines connected to it, one of which is line 30, leading to the idling cylinder 28. A second line 32 supplies oil under pressure from the oil pressure line 9 leading from oil pump 6. The third oil line 33 leads from the valve 31 to the engine crank case reservoir. The operating coil of valve 31 is indicated at 34 and when this coil is deenergized its armature 35 which actuates valve 31 is held in its uppermost position, as shown in Fig. 5, by means of a biasing spring 36. Hence, when coil 34 is deenergized, the idling cylinder is connected to the oil pressure line 9, piston 27 is elevated, and the setting of governor 11 has therefore been changed to cause the engine to operate at idling speed. On the other hand, when solenoid 34 is energized, armature 35 is drawn downwardly, forcing valve 31 to its lowermost position, thereby cutting off the oil pressure from line 32 and connecting the idling cylinder 28 through line 30 with discharge line 33 by which the oil within the cylinder is returned to the crank case reservoir, and hence governor 11 raises the engine speed to full speed.

For a purpose which will appear later in connection with the description of the locomotive control mechanism, governor 11 is provided with an interlock switch 37 actuated by arm 18. The arrangement is such that this switch is open when the engine 1 is not operating and closes when the engine reaches a speed slightly less than idling speed, and remains closed until the engine again slows down to a speed somewhat below idling speed.

Referring now to Fig. 1 of the accompanying drawings, in order to prevent the overloading of engine 1, main generator 2 is differentially compound wound, having a main or shunt field winding 38 and a differential series field winding 39. It also has a starting series field winding 40 inasmuch as the generator 2 is operated as a motor to start the engine by current from battery 5.

When the locomotive is being driven by the engine 1 the propelling motors 4 are connected with main generator 2 by mains 41 and 42 and an electromagnetically operated motor switch 43. Reversing switches 44 are arranged to reverse the connections of the fields and armatures of propelling motors 4 in a well understood manner, so as to enable the locomotive to be operated in either direction. It will be understood that these switches are operated simultaneously by means of a suitable remote control mechanism (not shown) so that they can be readily thrown by the locomotive engineer. Motors 4 are shown as permanently connected in parallel, but series-parallel connections may be used if desired. The circuits shown in Fig. 1 may be grounded to the structure of the locomotive at 45 if desired.

The speed of the locomotive is controlled by varying the strength of the shunt field 38 of the main generator which is separately excited from battery 5 through leads 46, 47 and field resistance 48. Electromagnetic switches 49, 50, 51, 52 and 53 control the amount of resistance in series with the field winding 38 when the generator is supplying power to the traction motors, as will be described in detail below.

The voltage of auxiliary generator 3 is controlled by means of a voltage regulator 54 of the compressible pile type. The carbon pile resistance 55 of this regulator is connected in series with the shunt field 56 of generator 3 and the operating coil 57 is connected across the terminals of the generator. On account of the fact that the auxiliary generator 3 is used to supply power to charge the battery and operate the auxiliary circuits only when the engine 1 is operating at full speed, voltage regulator 54 is required to hold constant voltage only over this full speed range, i. e., the range required for the operation of the engine governor 11. This range is from maximum to about eighty or ninety per cent. of maximum speed, depending upon the characteristics of the governor.

Battery 5 is connected through a reverse current relay 58 and lead 59 to electromagnetic switches 60 and 61. Switch 60 serves to connect the battery and the auxiliary circuits with the auxiliary generator 3, and switch 61 serves, through conductor 62, to connect the battery and the auxiliary circuits to the main generator 2. Reverse current relay 58 is provided with two operating coils, a voltage coil 63 and a current coil 64. Voltage coil 63 closes the contacts of relay 58 when the voltage of the charging generator rises to the voltage of the battery 5. Hence, voltage coil 63 is connected by the leads shown to main 42 and to both electromagnetic switches 60 and 61. This coil is therefore connected across the terminals of one of generators 2 or 3, depending upon which of switches 61 or 60 is closed. Current coil 64 is arranged to cause the switch to open whenever current tends to flow from the battery in a reverse direction through the relay.

Certain of the auxiliary apparatus, namely the lubricating oil pump 7, the control circuits which are indicated generally at 65 in Fig. 1, and the locomotive lights 66 are connected directly to the battery 5 through lead 67 and suitable switches as indicated. The remainder of the auxiliary apparatus, that is, the air compressor 68, the motors 69 for operating the cooling blowers for the propelling motors, and the motors 70 for operating the blowers for cooling the engine radiator (not shown) are connected only to the main generator 2 or the auxiliary generator 3, and this connection is made by means of lead 71 which is joined to lead 59 between electromagnetic switches 60—61 and reverse current relay 58. In this way, reverse current relay 58 prevents the auxiliaries just mentioned from being operated by battery 5. These motors could be operated from battery 5 if desired by merely connecting wire 71 to wire 67 instead of wire 59.

When the main generator 2 is being operated at idling speed by the engine 1 and is connected through electromagnetic switch 61 to operate the auxiliaries and charge the battery, its voltage is controlled by a second voltage regulator 72. This is similar to voltage regulator 54 having a carbon pile resistance 73 and an operating coil 74. In order to place voltage regulator 72 in operation an electromagnetic switch 75 is closed, thereby connecting one terminal of carbon pile resistance 73 directly to battery 5 through leads 47 and 46. The opposite terminal of resistance 73 is connected through lead 76 to the generator shunt field winding 38. Field switch 49 is, of course, open, cutting the field resistance 48 out of circuit.

In Fig. 2 are shown the connections of the circuits which control the operation of the apparatus diagrammatically indicated in Fig. 1. All of the various devices in all of the figures of the drawings are shown in the position which they would assume with the engine 1 shut down and the locomotive out of service. Current from battery 5 is supplied through a hand switch 77 to master controller 78. The starting and stopping of engine 1 is controlled by push-button switches 79 and 80. "Engine run" switch 79 will remain in either position to which it is moved, but "engine start" switch 80 is spring biased to open position as indicated. The return circuits to battery 5 from the various devices are through a common return lead 81 which is preferably grounded to the structure of the locomotive at 82, or, in case this is not desired, is connected to wire 42, Fig. 1.

Although Fig. 2 shows only a single master controller, the locomotive is preferably arranged for double-end operation, the second controller having been omitted to simplify the connections. The control system is suitable for multiple-unit operation and the locomotive is therefore provided with a train line 83 and jumpers 84 by means of which similar locomotives may be operated simultaneously by means of any of the master controllers in any of these locomotives. Master controller 78, in order to further simplify the drawings, has been shown as having only five accelerating positions and an off position, in which it is illustrated. It will be understood, however, that the exact number of accelerating positions will depend upon the size and weight of the particular locomotive and the amount of power developed by the engine 1.

The engine 1 is provided with an oil pressure operated switch 85 (see Figs. 2 and 3) which is connected by means of pipe 86 to the oil pressure line 9 from oil pump 6. This pressure responsive device may be of any suitable construction and has been shown diagrammatically in Fig. 2 as consisting of a cylinder within which is a piston 87, the movement of which is resisted by means of a spring. The piston rod 88 is arranged to simultaneously close and open two contacts 89 and 90. The device is calibrated so that these contacts will be closed as long as the oil pressure in the pipe 9 is above a predetermined amount required for the safe lubrication of the engine bearings.

The operation of the propulsion system will now be described, in the course of which the construction of the remaining parts of the apparatus will be set forth as necessary to an understanding of the invention.

It will be assumed that the engine 1 is cold and is not in operation, also that the controller is shut off and all of the switches and other parts of the various mechanisms are in the positions shown in the drawings. To start engine 1 the "engine run" switch 79 is closed by hand, which permits current from the battery 5 to flow through wires 91 and 92 to operate motor 7 which drives the lubricating oil pump 6. The operation of this pump builds up the lubricating oil pressure which may be indicated by a gauge (not shown) in front of the engineer, and as soon as the pressure rises to a predetermined amount, oil pressure switch 85 will be actuated, closing contacts 89 and 90.

Spring-biased "engine start" button 80 may then be pushed, thus energizing lead 93, and, since contacts 89 on the oil pressure switch are closed, current flows through wire 94 to energize the operating coil 95 of engine-starting switch 96. This closes the circuit from the battery 5 through lead 46 (Fig. 1), generator starting field 40, the armature of generator 2 and main 42 back to battery 5. Thus, as soon as the lubricating oil pressure has risen to a safe value, generator 2 is operated as a motor from battery 5 to start engine 1.

In order to energize the shunt field 38 of generator 2 to make available the maximum possible starting torque for starting the engine, provision is made for closing electromagnetic field switch 75, thus energizing shunt field winding 38 of the generator through the carbon pile resistance 73 of voltage regulator 72. Inasmuch as the carbon pile resistance is fully compressed, there being as yet no voltage on its operating coil 74, substantially maximum field current flows through shunt field 38. The closing of switch 75 is accomplished by means of interlock contacts 97 on generator starting switch 96 which close at the time this switch closes, thus completing a circuit from wire 93 through wire 98 and operating coil 99 of switch 75. The circuit is completed through this coil to return wire 81 through interlock contacts 100 on auxiliary generator switch 60 which contacts are closed so long as this switch is open.

From the combined effect of the full shunt field 38 and the generator starting field 40, generator 2, operating as a motor, will have sufficient torque to turn the engine over and bring it up to a speed at which it will commence to fire. As soon as this occurs the "engine start" button 80 may be released by the engineer. This opens starting switch 96 and its interlock contacts 97, thereby opening field switch 75.

The control mechanism by which it is insured that the engine will be operated at idling speed for a predetermined period (say, two minutes) every time it is started will now be described. This period of idling enables a proper flow of lubricating oil to the bearings to be established before the engine can be made to develop full speed or load. Also, mechanism is included which insures that the engine, when it is cold, will be operated for an additional period of time (say, eight minutes) at idling speed so as to allow time for it to warm up to a temperature at which it can be safely operated at full speed and load.

The operating coil of magnet valve 31 is not energized. Therefore, oil pressure has been admitted to idling cylinder 28, and engine governor 11 consequently is set to operate the engine at idling speed. Just before the engine reaches idling speed the interlock switch 37 which is actuated by governor 11 closes its contacts. This closes the circuit through devices which prevent the setting of the governor 11 from being changed until after the engine has operated at idling speed for a predetermined time. It also causes main generator 2 to be connected with the auxiliaries and battery 5, as will be described later on, so that the engine will carry a small load, thus causing it to warm up more quickly.

By the closing of interlock switch 37 wires 101 and 102 are energized. Current flows through wire 102 to the heating element 103 of a thermostatic time delay relay 104, relay contacts 105, wire 106, contact 107 of an electromagnetic relay 108, and return wire 81 back to battery 5. A second thermostatic time delay relay 109 has its heating element 110 connected in series with the heating element 103 of delay relay 104, and wire 111 places both of these heating elements in series with the operating coil 112 of electromagnetic relay 108.

The construction of the thermostatic time delay relays 104 and 109 is shown in detail in Fig. 6 of the drawings. These devices each comprise a shell 113 of insulating material such, for example, as vulcanized fibre, having contact clips 114 and 115 at its ends and a third contact segment 116 in the side of the shell. The device is adapted to be received and held in position by a base member (not shown) which is similar to the base ordinarily used for receiving fuses of the cartridge type.

The heating element is shown at 117, one end of which is connected to terminal clip 114, and the other end of which is fixed at 118 to a heat absorbing copper block 119. The connection at 118 is such as not only to make good electric contact, but also an effective heat transmitting contact so that heat developed in heating element 117 will be transferred to copper block 119 and thence to a bimetallic thermostatic strip 120 which is also mounted in heat conducting and current conducting relation to copper block 119. These parts are held in permanent relation to one another by means of a screw 121, the head 122 of which is beneath clip 115 so that access to the interior of shell 113 cannot be had without mutilating the clip. A connection 123 is provided between copper block 119 and terminal clip 115 for the heating current through heating element 117.

The outer end of bimetallic strip 120 is provided with a contact 124 which moves into and out of electrical conducting relation with the tip of a contact screw 125 in contact segment 116. When screw 125 has been adjusted during the manufacture of the thermostatic time delay relay to obtain proper operation, its head is covered with solder or otherwise made inaccessible so that the adjustment cannot be altered thereafter.

In the operation of this thermostatic time delay relay, the current passes through the heating device 117 thereof, thence by way of copper block 119 to bimetallic strip 120, leaving the device through contacts 124—125 and contact segment 116, and causes the gradual heating up of thermostatic strip 120, thereby ultimately opening contacts 124—125. These contacts will open when a definite and fixed time has elapsed after current through the heating element 117 is established, and in order to obtain a considerable delay in the opening of the contacts, a shield 126, consisting of a strip of asbestos is placed between heating device 117 and bimetallic strip 120. This shields the bimetallic strip from the radiant heat given out by heating device 117 and, by varying the width and length of shield 126, the desired time lag is obtained. In this way, each thermostatic time delay relay may be calibrated during manufacture to provide the desired time lag, and this time lag cannot be changed thereafter.

Thus, thermostatic time delay relay 104 may be constructed to open its contacts 105 at the end of a predetermined time (say, two minutes) after interlock switch 37 closes. When contacts 105 open current will commence to heat the heating element 110 of thermostatic time delay relay 109, flowing through this element and thence through relay contacts 127, and wire 128 to the contacts 129 of a thermostatic switch 130 (Fig. 3) which is arranged to be responsive to the temperature of the oil in engine manifold 10. This thermostatic switch is so designed as to close its contacts whenever the temperature of the oil being delivered to the engine bearings through manifold 10 falls below a predetermined value, for example, 90° F., and to open them slightly above this value. Hence, if the engine is cold, contacts 129 will be closed and the current will flow through these contacts and contact 107 of electromagnetic relay 108, as before, to the return wire 81.

This will continue until the end of a predetermined time (say, eight minutes), depending upon the characteristics of time delay relay 109, when the contacts 127 of this relay will open, and operating coil 112 of relay 108, being no longer short-circuited, will be energized. This lifts the relay switch from contact 107 to contact 131 which, as will be presently seen, prepares the circuit of operating coil 34 of governor changing valve 31 so that this valve can respond to the operation of the master controller 78 to change the governor setting to bring the engine up to full speed. This cannot actually take place, however, until the master controller 78 is moved to the first position.

In this way, the control mechanism insures that engine 1 be operated at idling speed for a total time of ten minutes when a start is made with the engine cold, this time being measured from the instant when the engine is brought to a speed just below idling speed so that the interlock switch 37 closes. After the opening of thermostatic delay relay 105, relay 108 will be actuated by the opening of either contacts 127 or thermostatic switch 130, so that if the temperature of the engine is below 90 degrees (the setting of thermostatic switch 130), and, during the eight minute period, warms up to a temperature above 90 degrees, the circuit of operating coil 34 of governor changing valve 31 will be prepared for energization by the movement of the master controller as soon as the thermostatic switch 130 opens. This period of ten minutes is made up of a period of two minutes which is required for the actuation of thermostatic delay relay 104 and a period of eight minutes which is required for the actuation of delay relay 109.

If, however, the engine is still warm from a previous period of operation, or, in other words, has not been standing idle for a sufficient length of time for the oil in manifold 10 to cool down below the closing temperature of thermostatic switch 130, the eight-minute period is eliminated. The two minute protective period afforded by thermostatic relay 104 is retained however, in any event, so that it is impossible after a shutdown to operate engine 1 at full speed until after the engine has operated for a period of two minutes at idling speed so as to allow time for a proper flow of lubricating oil to the bearings to be established.

It was mentioned above that at the time interlock switch 37 is closed by the engine governor (just before the engine reaches idling speed), in addition to establishing the circuits just described in detail, it also causes main generator 2 to be connected with the auxiliaries and battery 5. This is accomplished by the flow of current from wire 101 through wire 132, contact 133 of an electromagnetic relay 134, wire 135, interlock contacts 136 on motor switch 43, wire 137 to the operating coil 138 of the main generator switch 61, and thence through interlock contacts 100 of auxiliary generator switch 60 to return wire 81. This causes switch 61 to close, thereby connecting generator 2 to the auxiliary circuits, as just mentioned. The automatic closing (previously described) of reverse current relay 58 when the voltage of the generator rises to that of the battery 5 connects the battery to generator 2.

In order that the voltage of main generator 2 may be regulated and held constant so long as the engine is operating at idling speed and this generator is supplying power to the auxiliary circuits and battery, the voltage regulator 72 is connected in circuit. This is done by closing field switch 75 which is effected by means of a branch circuit 139 from interlock contacts 136 on motor switch 43 through interlock contacts 140 on engine starting switch 96, wire 141, wire 98, through operating coil 99 of field switch 75, and thence through interlock contacts 100 of auxiliary generator switch 60 to return wire 81. The operating coil 74 of voltage regulator 72 is connected through wire 142 to generator switch 60 and 61 at all times. This causes the voltage regulator operating coil 74 to be energized before field switch 75 closes and permits the regulator to respond more quickly than would be the case if coil 74 were not energized until the field switch 75 closes.

This completes the connections of the various parts of the system to enable the main generator 2 to supply current to the auxiliaries and the storage battery so long as the engine operates at idling speed.

We will assume that the engine has been operating in this manner for a period of ten minutes during which time the oil flow has had an opportunity to be fully established and all parts of the engine have warmed up to a safe operating temperature. At the end of this time the contacts 127 of thermostatic time delay relay 109 open. When contacts 127 open, this causes the actuation of electromagnetic relay 108 as will have been understood from the previous description, thereby moving the switch element of relay 108 from contact 107 to contact 131 and preparing the circuit for the operating coil 34 of governor changing valve 31 to be operated by the first movement of the locomotive master controller.

As the resistance of operating coil 112 of relay 108 is high, the placing of this coil in series with the heating elements 103 and 110 will reduce the current through these heating elements to an amount which will have practically no heating effect on these elements, the current through these elements previously having been limited only by the resistance of the elements themselves and by means of a balancing resistance 144 which may be included if necessary. The heating elements 103 and 110 are now allowed to cool down because of this reduction in current, thereby permitting their contacts 105 and 127 to close so as to be ready to operate at a subsequent starting of engine 1.

If control switch 77 is now closed and master controller 78 is moved to the first position, current will flow through wires 145 and 146 and energize the operating coil 147 of motor switch 43 and the operating coil 148 of field switch 49. This closes these two switches. Motor switch 43 in closing changes the position of all of its interlock contacts. Hence, interlock contacts 149 close, establishing current flow from wire 101 through wire 150 to operating coil 34 of governor changing valve 31, and, electromagnetic relay 108 having been energized as previously described, the circuit from this operating coil is completed through contact 131 and the switch member of relay 108 to return wire 81. This causes governor changing valve 31 to move downwardly, thereby cutting off the supply of oil to fluid pressure cylinder 28 and changing the setting of governor 11 so as to cause it to raise the operating speed of the engine from idling speed to full speed.

The closing of motor switch 43 opens interlock contacts 136 and hence breaks the circuit through wires 135 and 137, thus deenergizing operating coil 138 of main generator switch 61 and causing this switch to open. The opening of these same interlock contacts 136 also breaks the circuit through wires 135, 139, 141 and 98, thus deenergizing operating coil 99 of field switch 75. The opening of switch 61 disconnects the main generator 2 from the auxiliaries and battery, and the opening of field switch 75 disconnects automatic voltage regulator 72.

The opening of main generator switch 61 causes the closing of its interlock contacts 151 thereby establishing a circuit from wire 150 through the operating coil 167 of auxiliary generator switch 60, contacts 131 of relay 108 to return wire 81. Thus, as soon as main generator switch 61 opens, auxiliary generator switch 60 closes so that the operation of the auxiliaries, air compressor, blowers, etc. and charging of battery 5 is transferred from the main generator 2 to auxiliary generator 3. Reverse current relay 58 will open as soon as switch 61 opens. The battery will be reconnected as soon as the engine has reached full speed and the voltage of auxiliary generator 3 has reached normal, thereby causing reverse current relay 58 to close.

The compressible resistance 55 of voltage regulator 54 and field winding 56 of auxiliary generator 3 are at all times connected across the terminals of this generator. Also, operating coil 57 of this voltage regulator is at all times similarly connected. Hence, there is some current flowing through field winding 56 even when generator 30 is operating at idling speed, and, consequently, as the engine speed rises from idling speed to full speed, the excitation of generator 3 increases promptly and the generator is ready to deliver full voltage under the control of voltage regulator 54 practically as soon as full speed is reached.

The engine 1 is now operating at full speed and ready to deliver its maximum power and the locomotive is therefore capable of accelerating its train load at the maximum rate as the controller 78 is notched up from its first position to the fifth position, thereby successively energizing wires 152 to 155, inclusive, and the corresponding operating coils 156 to 159 of field switches 50 to 53, inclusive. It will be understood that the cutting out of field resistance 48 in steps by means of field switches 50 to 53 increases the current through the shunt field winding 38 of generator 2 and thereby gradually increases the voltage applied to the propelling motors 4 by generator 2.

In order to prevent the engine 1 from being repeatedly speeded up and slowed down by the throwing of the controller on and off, very frequently at short intervals, as occurs in switching service, I have arranged the control mechanism in such a way as to remove the control of the engine speed from the master controller 78 as soon as controller 78 has been moved to its first position, and entirely withholding the control of the engine speed from the master controller for a predetermined time (say, for example, five minutes), after the controller has been moved to off position. In this way, the engine 1 will continue to run at full speed during this predetermined length of time, but at the expiration of that time the engine will be automatically reduced to idling speed and the control of the engine governor again returned to the master controller so that the first time thereafter that the master controller is again moved to the first position, the engine will again immediately return to full speed. The control mechanism which accomplishes this result is as follows:

This mechanism includes electromagnetic relay 134, an extra interlock contact 160 on motor switch 43, and a third thermostatic delay relay 161 together with a balancing resistance 162 for limiting the current through this relay to the proper value. The closing of motor switch 43 which occurs on movement of controller 78 to its first position as above described, caused interlock contacts 149 thereon to establish the flow of current from wire 101 to wire 150. In addition to energizing operating coil 34 of governor changing valve 31, this also energized the operating coil of relay 134, current flowing from this operating coil through wire 163, contacts 164 of thermostatic delay relay 161, wire 168, and contact 131 of relay 108 to return wire 81. This caused the switch member of relay 134 to move from contact 133 to contact 165, thus establishing a holding circuit for relay 134 so that the relay will remain in this position after the motor switch 43 is again opened as will occur as soon as the master controller 78 is moved to off position.

When the controller is now moved to the off position, thus opening motor switch 43, interlock contacts 149, which initially energized wire 150 and the operating coil 34 of governor changing valve 31, open, but wire 150 continues to be energized by the holding circuit just referred to through wire 132 and contact 165 of relay 34. Hence, the operating coil of governor changing valve 31 continues to be energized and therefore the engine remains at full speed.

The opening of motor switch 43 also causes the closing of its interlock contacts 160 which completes a circuit from wire 150 to wire 166, resistance 162, the heating element of thermostatic delay relay 161 to wire 168, and contact 131 of relay 108 to return wire 81. Thermostatic time delay relay 161 is identical in construction with delay relays 104 and 109 except for the time setting. Relay 161 is arranged to open its contacts 164 at the end of such time after controller 78 is moved to the off position as it is desired to cause engine 1 to slow down to idling speed. At the end of that time (say, 5 minutes) contacts 164 will open, thereby breaking the circuit through the operating coil of relay 134 and causing its switch arm to descend into contact with contact 133. This cuts off the supply of current from wires 101 and 132 to wire 150 and hence deenergizes operating coil 34 of governor control valve 31 and the operating coil 167 of auxiliary generator switch 60. The engine 1 then slows down to idling speed and auxiliary generator 3 is disconnected from the auxiliary circuits and battery 5. The failure of current supply to wire 150, also, through wire 166 shuts off the current through the heating element of thermostatic delay relay 161, thereby allowing the relay to cool down and be ready for a subsequent operation.

The opening of auxiliary generator switch 60 causes its interlock contacts 100 to be closed and the dropping of relay 134 reestablishes current from wire 132 through contact 133 to wire 135 and thence through interlock contacts 136 and wire 137 to operating coil 138 of main generator switch 61; also from contacts 136 to interlock contacts 140, wire 141 and wire 98 to the operating coil 99 of field switch 75. This reconnects main generator 2 with the auxiliary circuits and places voltage regulator 72 again in operation to control the voltage of generator 2. Hence, the opening of contacts 164 of delay relay 161 at the end of the five-minute period has caused all the various parts of the system to be restored to the same operating conditions that existed before the master controller 78 was originally moved to its first position. These conditions will continue until the locomotive is again moved, or engine 1 is shut down by opening manually operated "engine run" switch 79.

With the improved control system of my present invention, it is insured that the internal combustion engine will be operated at idling speed for a predetermined period (say, two minutes) every time it is started, thus enabling the lubricating oil to reach all the bearings under pressure to provide proper lubrication before the engine is called upon to operate at full speed and load. Furthermore, when the engine is cold, the provision of delay relay 109 and the thermostatic switch 130 insures that the engine must be operated for an additional period of time (say, eight minutes) at idling speed before the engine is subjected to full speed or load. This will allow time for the usual temperature changes to take place within the engine and avoid excessive localized expansion that might take place in some of the engine parts were the engine allowed to operate at full speed immediately after starting.

It will be understood, however, that while the engine is being operated at idling speed, it is possible to move the locomotive by manipulating the master controller 78 as there is nothing to prevent the closure of motor contactor 43 and field switches 49 to 53, inclusive, so as to apply power from the main generator 2 at reduced voltage to the traction motors. This will be sufficient to move the locomotive at a slow speed. During this operation of the locomotive, the auxiliaries, such as the air compressor, traction motor blowers and radiator blowers, could not be operated but the lubricating oil pump, locomotive lights and control circuits will receive power from the storage battery 5, and, if desired, the air compressor motor 68 can also be connected to operate directly from battery 5.

In the design of locomotives of this type the auxiliary generator 3 is preferably arranged to deliver approximately 125 volts and the main generator 2 approximately 600 volts. If the idling speed is about one half of the full speed, as is customary practice in Diesel engine design, then the main generator will be capable of giving about one quarter normal voltage with full field at idling speed. This is approximately 150 volts or slightly more than is required for the auxiliaries and for charging the battery so that the voltage regulator 72 will be enabled to effect excellent voltage regulation.

By means of my present improvements, the full speed operation of the internal combustion engine and generator of a locomotive of this type is made practical independently of the operation of the master controller. This greatly improves the performance of the locomotive as a whole, enabling it to accelerate faster and thus respond more promptly to the operation of the controller. This enables the locomotive to handle cars in switching service very much more effectively. The operation of the engine at constant full speed makes available the inertia of the engine and the generator to assist in maintaining the speed of the engine as the generator is loaded up during acceleration of the locomotive.

It sometimes requires a few seconds for an engine governor to respond to a drop in speed due to a sudden increase in load and change the fuel injection sufficient to restore the speed again, but with the present improvements in the control system, such a tendency to drop in speed will tend to be compensated for by the inertia of the engine and generator. Along with the advantages of operating the engine at substantially constant full speed so long as the locomotive is being used, the possibility of operating the engine at full speed without load for long periods of time when the locomotive is waiting for orders, etc., is effectively avoided.

The above results are obtained, moreover, through the employment in the control system of devices which are available at moderate cost and which, nevertheless, because of their simplicity of construction, are dependable in operation.

I claim:

1. A propulsion system for vehicles comprising an electric propelling motor, an engine for supplying power therefor, a generator operated by the engine, connections between the generator and the propelling motor, control means disposed to control the said connections, said engine being arranged to operate at substantially full speed independently of the speed of the vehicle, and means for reducing the engine speed at the expiration of a predetermined time after the connections between the generator and the propelling motor have been broken by the control means.

2. A propulsion system for vehicles comprising an electric propelling motor, an engine for supplying power therefor, a generator operated by the engine, connections between the generator and the propelling motor, control means disposed to control the said connections, said engine being arranged to operate at substantially full speed independently of the speed of the vehicle, means for maintaining the engine at full speed after the connections between the generator and propelling motor have been broken by the said control means, and means operable at a predetermined time after said connections have been broken for reducing the engine speed.

3. A propulsion system for vehicles comprising an electric propelling motor, an engine for supplying power therefor, a generator operated by the engine, connections between the generator and the propelling motor, control means disposed to control the said connections, said engine being arranged to operate at substantially full speed independently of the speed of the vehicle, means for slowing the engine to idling speed at the expiration of a predetermined time after the connections between the generator and the propelling motor have been broken by the control means, and means for causing the engine to return to substantially full speed immediately upon said connections being reestablished by the control means.

4. A propulsion system for vehicles comprising an electric propelling motor, an engine for supplying power therefor, a generator operated by the engine, connections between the generator and the propelling motor, control means disposed to control the said connections including a plurality of accelerating positions, said engine being arranged to operate at substantially full speed independently of the speed of the vehicle, means for reducing the speed of the engine at the expiration of a predetermined time after the connections between the generator and propelling motor have been broken by the control means, and means for causing the engine to return to substantially full speed as soon as said control means is actuated to the first accelerating position.

5. In a power system an engine, a generator operated by the engine, an electric motor, connections between the generator and the motor including a switch, a governor for the engine, a device for changing the governor to cause the engine to operate at reduced speed, electro-thermostatic time delay means for causing said device to operate to reduce the engine speed, and means for establishing a circuit through said time delay means when said switch opens.

6. In a power system including an internal combustion engine, means for operating the engine at reduced speed for a predetermined time after the starting of the engine, and means for thereafter operating the engine at full speed.

7. In a power system including an internal combustion engine, means for operating the engine at reduced speed for a predetermined time after the starting of the engine, and means operative at the end of said predetermined time for continuing the operation of the engine at reduced speed for a further predetermined time to allow the engine to reach a proper temperature for operation at full speed.

8. In a power system including an internal combustion engine, means for operating the engine at reduced speed for a predetermined time after the starting of the engine so as to allow a proper flow of lubricating oil to the engine bearings to be established and to allow the engine to reach a temperature at which it may safely operate at full speed and load, and means responsive to the temperature of the engine for shortening said time provided the engine is warm.

9. In a power system including an internal combustion engine, means for operating the engine at reduced speed for a predetermined time after the starting of the engine sufficient to allow a proper flow of lubricating oil to the bearings to be established, mechanism for continuing the operation of the engine at reduced speed for a further predetermined time sufficient to allow the engine to reach a temperature at which it may safely operate at full speed and load, and means responsive to the temperature of the engine for nullifying the action of said mechanism so as to allow the engine to be operated at full speed more quickly after starting when the engine is warm.

10. In a power system including an internal combustion engine, means comprising an electro-thermostatic time delay device for operating the engine at reduced speed for a predetermined time, and a speed-responsive switch for closing the circuit through said electro-thermostatic time delay device when the engine reaches a predetermined speed.

11. In a power system including an internal combustion engine, means for operating the engine at reduced speed for a predetermined time after the engine reaches a predetermined speed, and means operative at the end of said predetermined time for continuing the operation of the engine at reduced speed for a further predetermined time to allow the engine to reach a proper temperature for operation at full speed.

12. In a power system, an engine adapted to deliver power to said system, control means for controlling the delivery of power from said engine to said system, a governing device for regulating the speed of said engine, means interconnecting said governing device and said control means by which the operation of the governing device is modified to cause it to increase the speed of the engine from idling speed to full speed, and time delay means for interrupting the operation of said interconnecting means when the engine is started to insure the operation of the engine at reduced speed for a predetermined time before it is operated at full speed.

13. In a power system, an engine adapted to deliver power to said system, control means for controlling the delivery of power from said engine to said system, a governing device adapted to maintain the engine at substantially constant speed, changing mechanism for changing the speed maintained by the governor from reduced speed to full speed, means for actuating said mechanism by said control means so as to cause said engine to operate at full speed immediately upon the actuation of said control means, and means for interrupting the operation of said actuating means for a predetermined time after the engine is started.

14. In a power system, an engine adapted to deliver power to said system, control means for controlling the delivery of power from said engine to said system, a governing device adapted to maintain the engine at substantially constant speed, changing mechanism for changing the speed maintained by the governor from reduced speed to full speed, means for actuating said mechanism by said control means so as to cause said engine to operate at full speed upon the actuation of said control means, and means for maintaining the operation of said engine at full speed for a predetermined time after said control means has cut off the delivery of power to said system.

15. A propulsion system for vehicles comprising an electric propelling motor, an engine for supplying power therefor, a generator operated by the engine, connections between the generator and the propelling motor, vehicle control means disposed to control the said connections including a plurality of accelerating positions, an engine speed control mechanism including an operating coil for actuating the same to cause the engine to operate at full speed, the circuit of said operating coil being energized through the moving of said control means to its first accelerating position, devices for completing said circuit including electro-thermostatic time delay means, and a speed-responsive switch for closing the circuit through said means when the engine speed increases to substantially idling speed whereby at a predetermined time thereafter said circuit through the operating coil of said engine speed control mechanism will be prepared for energization by the vehicle control means.

16. In a power system including an internal combustion engine, time delay means for operating the engine at reduced speed for a predetermined time, and a device responsive to the speed of the engine for initiating the operation of said means.

17. In a power system an engine adapted to deliver power to said system, control means for controlling the delivery of power from said engine to said system, a governing device adapted to maintain the engine at substantially constant speed, changing mechanism for changing the speed maintained by the governor from reduced speed to full speed, means for actuating said mechanism by said control means so as to cause said engine to operate at full speed upon the actuation of said control means, time delay means for interrupting the operation of said changing mechanism by said control means to insure the operation of the engine at reduced speed for a predetermined time before it is operated at full speed, and means for maintaining the operation of said engine at full speed for a predetermined time after said control means has cut off the delivery of power to said system.

18. A propulsion system for vehicles comprising an electric propelling motor, an engine for supplying power therefor, a generator operated by the engine, connections between the generator and the propelling motor, said engine being arranged to operate at substantially full speed independently of the speed of the vehicle, means for slowing the engine to idling speed at the expiration of a predetermined time after the connections between the generator and the propelling motor have been broken, and means for causing the engine to return to substantially full speed.

19. A propulsion system for vehicles comprising an electric propelling motor, an engine for supplying power therefor, a generator operated by the engine, connections between the generator and the propelling motor, control means disposed to control the said connections, said engine being arranged to operate at substantially full speed independently of the speed of the vehicle, means for slowing the engine to idling speed at the expiration of a predetermined time after the connections between the generator and the propelling motor have been broken, and means responsive to the control means for causing the engine to return to substantially full speed.

20. In a power system an engine, a generator operated by the engine, an electric motor, connections between the generator and the motor including a switch, a governor for the engine, a device for changing the governor to cause the engine to operate at reduced speed, time delay means for causing said device to operate to reduce the engine speed, and means for placing said time delay means in operation when said switch opens.

21. In a power system including an internal combustion engine, time delay means for operating the engine at reduced speed for a predetermined time, means for thereafter operating the engine at full speed, and means responsive to the engine temperature for preventing the operation of the engine at full speed until the temperature thereof rises to a predetermined value.

22. In a power system including an internal combustion engine, means for operating said engine at full speed and at reduced speed, and means responsive to the engine temperature for compelling the operation of the engine at reduced speed until the temperature thereof rises to a predetermined value.

23. In a power system including an internal combustion engine, means for operating said engine at full speed and at reduced speed, and electro-thermostatic time delay means for compelling the operation of the engine at reduced speed at the end of a predetermined time after the engine load has been reduced to a predetermined value.

24. In a power system including an internal combustion engine, means comprising an electro-thermostatic time delay device for operating the engine at reduced speed for a predetermined time, and means operable upon the starting of said engine for closing the circuit through said electro-thermostatic time delay device.

WILLIAM S. H. HAMILTON.

---

CERTIFICATE OF CORRECTION.

Patent No. 2,021,005.  November 12, 1935.

WILLIAM S. H. HAMILTON.

It is hereby certified that error appears in the printed specification of the above numbered patent requiring correction as follows: Page 5, first column, line 53, beginning with the word "After" strike out all to and including the word and period "opens." in line 64, and insert the same after line 74, of same page and column; and that the said Letters Patent should be read with these corrections therein that the same may conform to the record of the case in the Patent Office.

Signed and sealed this 17th day of December, A. D. 1935.

(Seal)

Leslie Frazer

Acting Commissioner of Patents.